US008660404B2

(12) United States Patent
Itoh

(10) Patent No.: US 8,660,404 B2
(45) Date of Patent: Feb. 25, 2014

(54) REPRODUCING APPARATUS

(75) Inventor: Masanori Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 169 days.

(21) Appl. No.: 13/307,434

(22) Filed: Nov. 30, 2011

(65) Prior Publication Data
US 2012/0121233 A1 May 17, 2012

Related U.S. Application Data

(60) Continuation of application No. 12/639,226, filed on Dec. 16, 2009, now Pat. No. 8,090,238, which is a division of application No. 10/819,851, filed as application No. PCT/JP03/08891 on Jul. 11, 2003, now Pat. No. 7,660,214.

(30) Foreign Application Priority Data

Jul. 12, 2002 (JP) .................................. 2002-203838

(51) Int. Cl.
*H04N 9/80* (2006.01)
(52) U.S. Cl.
USPC ........................................................ 386/241
(58) Field of Classification Search
None
See application file for complete search history.

(56) References Cited

U.S. PATENT DOCUMENTS

| 5,191,567 | A | | 3/1993 | Yasuda et al. |
| 5,644,506 | A | | 7/1997 | Okazaki et al. |
| 5,706,388 | A | * | 1/1998 | Isaka ............................. 386/206 |
| 5,818,439 | A | | 10/1998 | Nagasaka et al. |
| 5,999,694 | A | | 12/1999 | Yasuda et al. |
| 6,055,502 | A | | 4/2000 | Kitamura |
| 6,172,989 | B1 | | 1/2001 | Yanagihara et al. |
| 6,532,334 | B1 | | 3/2003 | Kikuchi et al. |
| 6,532,593 | B1 | | 3/2003 | Moroney |
| 6,570,837 | B1 | * | 5/2003 | Kikuchi et al. ............ 369/275.1 |
| 6,724,981 | B1 | | 4/2004 | Park et al. |
| 6,876,432 | B2 | | 4/2005 | Togashi et al. |
| 7,099,239 | B2 | | 8/2006 | Ogikubo |
| 7,349,623 | B1 | | 3/2008 | Fujita et al. |
| 2001/0028784 | A1 | | 10/2001 | Takasu et al. |
| 2002/0025136 | A1 | | 2/2002 | Ando et al. |

(Continued)

FOREIGN PATENT DOCUMENTS

EP 1 011 268 A1 6/2000
EP 1 050 880 A1 11/2000

(Continued)

OTHER PUBLICATIONS

International Search Report for International Application No. PCT/JP03/08891, Nov. 25, 2003, Panasonic Corporation.

(Continued)

*Primary Examiner* — Huy T Nguyen
(74) *Attorney, Agent, or Firm* — RatnerPrestia

(57) ABSTRACT

A reproducing apparatus includes a reproducing section picking up any signals compressed in a plurality of different compression methods from a recording medium. The recording medium records the signals compressed in a plurality of different compression methods and record management information denoting association of the signals compressed in a plurality of different compression methods with each other, respectively. A decoding section decodes the signal picked up from said recording medium, and a recording section records reproduction management information including reproduction-interruption information in the reproducing section associated with the record management information onto the recording medium.

21 Claims, 16 Drawing Sheets

(56) References Cited

U.S. PATENT DOCUMENTS

| | | |
|---|---|---|
| 2002/0048450 A1 | 4/2002 | Zetts |
| 2003/0007780 A1 | 1/2003 | Senoh |
| 2004/0096110 A1 | 5/2004 | Yogeshwar et al. |
| 2004/0252980 A1 | 12/2004 | Watanabe |

FOREIGN PATENT DOCUMENTS

| | | |
|---|---|---|
| JP | 08-292965 | 11/1996 |
| JP | 2001-101849 | 4/2001 |
| JP | 2001-169250 | 6/2001 |
| JP | 2001-285760 | 10/2001 |
| JP | 2001-344874 | 12/2001 |
| JP | 2001-350483 | 12/2001 |
| KR | 2001-0034279 | 4/2001 |
| WO | WO 2004-019612 A1 | 3/2004 |

OTHER PUBLICATIONS

Supplementary European Search Report for EP 03 79 2625, Jun. 3, 2010.

* cited by examiner

Fig. 7

| Time Information | Reproduction Time of VOBU [Number of Fields] | Data Size of VOBU [Number of Packs] |
|---|---|---|
| | 1 sec. | 610 |
| | 1 sec. | 730 |
| | 0.5 sec. | 650 |
| | 1 sec. | 580 |
| | ------ | ------ |

Minimum Size of Continuous Data Area = $\dfrac{Vo \cdot Tj}{(Vr - Vo)} \cdot Vr$

REPRODUCING APPARATUS

This application is a continuation of U.S. patent application Ser. No. 12/639,226, filed Dec. 16, 2009, which is a divisional of U.S. patent application Ser. No. 10/519,851, filed Dec. 29, 2004, now U.S. Pat. No. 7,660,214, issued Feb. 9, 2010, which is a U.S. National Phase Application of PCT International Application PCT/JP03/08891, the contents of which are incorporated herein by reference.

FIELD OF THE INVENTION

The present invention relates to a reproducing apparatus for recording/reproducing motion video with a recording medium such as an optical disc.

BACKGROUND OF THE INVENTION

A system stream defined by MPEG2 standard (ISO/IEC 13818-1) is already known as a method for compressing video in a low bit rate. Three types of streams, a program stream (PS), a transport stream (TS), and a PES stream, are defined in the system stream.

In addition, a system stream defined by MPEG4 standard (ISO/IEC 14496-1) is also already known as a method for compressing in a lower bit rate. Five types of streams, a program stream (PS), a transport stream (TS), an H223 stream, an RTP stream, and an MP4 stream, are defined in the system stream.

On the other hand, an optical disc such as DVD-RAM, MO has become to be significant as a video recording medium replacing a magnetic tape. FIG. 16 shows a construction of a conventional AV data recording and reproducing apparatus 300 for video with a DVD-RAM disc. In FIG. 16, a program stream is generated from input signals from a video signal input section 100 and an audio signal input section 102 by a compressing section 301, respectively, and the generated program stream is written in a DVD-RAM disc 131 through a recording section 320 and a pickup 130. In reproduction, the program stream read through the pickup 130 and a reproducing section 321 is decoded into a video signal and an audio signal by a decoding section 311, and the decoded video and audio signals are provided to a video signal output section 110 and an audio signal output section 112. The compressing section 301 can compress a signal in MPEG2 and in a lower rate than MPEG2. The decoding section 311 can decode a signal compressed in MPEG2 or a signal compressed in the lower rate than MPEG2.

In recording, a recording control section 341 controls the recording section 320. In addition, according to an instruction of the recording control section 341, a continuous-data-area detecting section 340 checks availability of a sector managed by a logic block management section 143, and detects a physically continuous available area. When a recorded video signal file is deleted, the recording control section 341 controls the recording section 320 and the reproducing section 321, and performs deleting process.

Thus, conventionally, the AV data recording and reproducing apparatus 300 reproduces a signal compressed in MPEG2 for example, and a user plays video and audio by connecting it to a display apparatus such as a TV.

Recently, a portable video player capable of playing video in a further lower bit rate has been introduced. While, such a portable video player 400 has a similar construction to the AV data recording and reproducing apparatus 300, a battery (not shown) is used in the portable video player 400 as a power source to be carried for playing.

Accordingly, for example, when a user records a broadcast program, in the case that a user views the broadcast program on a TV screen, the user records a video signal and an audio signal of the program onto a recording medium with compressing in MPEG2 (hereinafter referred to as "record in MPEG2"), for example. In addition, in the case that the user views the program on the portable video player 400, the user records the video signal and the audio signal with compressing in a low bit rate lower than in MPEG2 (referred to as "record in a low bit rate"). Additionally, both of the AV data recording and reproducing apparatus 300 and the portable video player 400 have a resuming function which, after interrupting playing video, allows to play the subsequent video on the apparatus that interrupted playing the video (for example, see Japanese Laid-Open Patent Publication KOKAI No. 2001-344874).

On the other hand, there is a case that the user records the program in a low bit rate at first to play the program on the portable video player 400, and then he or she plays the recorded program on the portable video player 400 outdoors and stops playing it. After that, the user may play the subsequent video from the some midpoint in his or her home. In such a case, the program is recorded onto the recording medium only in the low bit rate. Therefore, there was a problem that the user cannot play it in high-resolution image quality even if he or she plays it on a TV screen much larger than the display of the portable video player 400.

In addition, there is the other thinkable case where the user records a program in MPEG2 to play the program on a TV in his or her home, and then he or she plays the recorded program in the home and stops playing it at some midpoint. After that, the user may play the subsequent video from the some midpoint on the portable video player 400 outdoors. In such a case, the program is recorded onto the recording medium only in MPEG2. Therefore, the portable video player 400 should decode the signal recorded in MPEG2. The signal recorded in MPEG2 requires much larger power consumption as compared with the signal recorded in a low bit rate when read or decoded. Accordingly, there was a problem where a battery of the portable video player 400 tends to exhaust quickly.

Thus, since a playing mode is specified when a program is recorded, it is difficult that the program is played suitably according to conditions (image quality, a bit rate, power consumption, etc.) of each playing mode when the previously specified playing mode is changed.

SUMMARY OF THE INVENTION

In consideration of the above problem, it is an object of the present invention to provide a reproducing apparatus capable of playing video and/or audio suitably for a condition of each playing mode even when a previously specified playing mode is changed.

The first present invention is a reproducing apparatus, comprising:

a reproducing unit that extracts, from a recording medium in which signals that have same contents but are compressed in a plurality of different conditions, and record management information that denotes a mutual association between said signals that have the same contents but are compressed in a plurality of different conditions are recorded, respectively, any of said signals;

a decoding unit that decodes any of said signals extracted from said recording medium; and a recording unit that records, in correspondence to said record management information, reproduction management information including reproduction middle information that denotes middle of a reproduction of signals from said recording medium.

The second present invention is the reproducing apparatus according to the first present invention, wherein said recording unit records said reproduction management information on said recording medium.

The third present invention is the reproducing apparatus according to the first present invention, further comprising a built-in flash memory, wherein said reproduction management information is recorded on said flash memory.

The fourth present invention is the reproducing apparatus according to the third present invention, wherein said reproducing unit further extracts said reproduction management information from said flash memory, and based on said record management information and said reproduction management information, extracts, from said recording medium, signals after signals corresponding to said reproduction middle information included in said reproduction management information.

The fifth present invention is the reproducing apparatus according to any one of the first to the fourth present inventions, wherein said reproduction middle information concerns elapsed time from start of reproduction of said signal.

The sixth present invention is the reproducing apparatus according to the third present invention, wherein said recording unit further records, in correspondence to said record management information and said reproduction management information, identification information of said recording medium on said flash memory.

The seventh present invention is the reproducing apparatus according to the sixth present invention, wherein said reproducing unit further extracts said record management information, said reproduction management information, and said identification information of said recording medium, any of signals extracted from said recording medium is suitable for said reproducing unit and/or said decoding unit, and said reproducing unit, based on said record management information, said reproduction management information, and said identification information of said recording medium, further extracts, from said recording medium, signals after signals corresponding to said reproduction middle information included in said reproduction management information.

The eighth present invention is the reproducing apparatus according to the first present invention, wherein said different conditions concern different bit rates, different numbers of pixels, or different compression methods.

The ninth present invention is the reproducing apparatus according to the first present invention, wherein said signals that have the same contents but are compressed in a plurality of different conditions are recorded on said recording medium so that each of said signals can be continuously reproduced.

The tenth present invention is the reproducing apparatus according to the first present invention, wherein said signals that have the same contents but are compressed in a plurality of different conditions are recorded respectively in continuous data areas, each of which has size that is equal to or larger than a predetermined size.

The eleventh present invention is the reproducing apparatus according to the tenth present invention, wherein said recording medium is an optical disc, a magneto-optical disc, or a magnetic disc, said reproducing unit has a head for reading a signal from said recording medium, and said predetermined size is expressed by the following equation:

$$Vo \times Tj \times Vr/(Vr-Vo) \quad \text{(equation 1)}$$

(Vo: data transfer rate to said decoding unit (Mbps), Tj: maximum seek time of said head (second), Vr: data-reading rate of each of said signals from said recording medium by said head (Mpbs)).

The twelfth present invention is the reproducing apparatus according to the first present invention, wherein said signals that have the same contents but are compressed in a plurality of different conditions are recorded respectively in continuous data areas, each of which has size that is equal to or larger than a predetermined size, and said continuous data areas are recorded in a form of being repeatedly alternately arranged.

The thirteenth present invention is the reproducing apparatus according to the tenth or the twelfth present inventions, wherein said signals compressed in a plurality of different conditions that are recorded in the continuous data areas, each of which has size that is equal to or larger than the predetermined size, have same reproduction time.

The fourteenth present invention is the reproducing apparatus according to the twelfth present invention, wherein said decoding unit further decodes signals compressed in a plurality of different conditions that are extracted from said recording medium.

The fifteenth present invention is the reproducing apparatus according to the eighth present invention, wherein said different compression methods are MPEG2 and MPEG4, respectively.

The sixteenth present invention is a recording apparatus, comprising:

a recording unit that records, on a recording medium, signals that have same contents but are compressed in a plurality of different conditions, and record management information that denotes a mutual association between said signals that have the same contents but are compressed in a plurality of different conditions;

a reproducing unit that extracts a signal recorded on said recording medium; and a decoding unit that decodes a signal extracted from said recording medium, wherein said recording unit records said signals that have the same contents but are compressed in a plurality of different conditions, respectively, in continuous data areas, each of which has size that is equal to or larger than a predetermined size, and records said continuous data areas on said recording medium in a form of being repeatedly alternately arranged.

The seventeenth present invention is the recording apparatus according to the sixteenth present invention, wherein said recording medium is an optical disc, a magneto-optical disc, or a magnetic disc, said reproducing unit has a head for reading a signal from said recording medium, and said predetermined size is expressed by the following equation:

$$Vo \times Tj \times Vr/(Vr-Vo) \quad \text{(equation 1)}$$

(Vo: data transfer rate to said decoding unit (Mbps), Tj: maximum seek time of said head (second), Vr: data-reading rate of each of said signals from said recording medium by said head (Mpbs)).

The eighteenth present invention is a recording and reproducing system, comprising:

a reproducing unit that extracts, from a recording medium in which signals that are compressed in a plurality of different conditions, and record management information that denotes a mutual association between said signals that are compressed in a plurality of different conditions are recorded, respectively, any of said signals;

a decoding unit that decodes any of said signals;

a transmitting unit that transmits any of said signals; and a remote decoding unit that decodes said transmitted signal, wherein said reproducing unit outputs said extracted signal to said decoding unit or said transmitting unit, and records, in correspondence to said record management information, reproduction management information including reproduction middle information with regard to decoding in said decoding unit or said remote decoding unit.

The nineteenth present invention is the recording and reproducing system according to the eighteenth present invention, wherein said reproducing unit can transmit said extracted signal to said remote decoding unit, and in said transmission, based on said record management information and said reproduction management information, transmits signals after signals corresponding to said reproduction middle information included in said reproduction management information.

The twentieth present invention is a reproducing method, comprising the steps of:

extracting, from a recording medium in which signals that have same contents but are compressed in a plurality of different conditions, and record management information that denotes a mutual association between said signals that have the same contents but are compressed in a plurality of different conditions are recorded, respectively, any of said signals;

decoding any of said signals extracted from said recording medium; and recording, in correspondence to said record management information, reproduction management information including reproduction middle information that denotes middle of a reproduction of signals from said recording medium.

The twenty-first present invention is the reproducing method according to the twentieth present invention, wherein the step of recording, in correspondence to said record management information, said reproduction management information means a step of recording, in correspondence to said record management information, said reproduction management information on a flash memory, the reproducing method further comprising the steps of:

extracting said reproduction management information from said flash memory, and based on said record management information and said reproduction management information, extracting, from said recording medium, signals after signals corresponding to said reproduction middle information included in said reproduction management information.

The twenty-second present invention is a program that causes a computer to perform functions as the reproducing unit that extracts, from said recording medium, any of said signals, the decoding unit that decodes any of said signals extracted from said recording medium, and the recording unit that records, in correspondence to said record management information, said reproduction management information, of the reproducing apparatus according to the first aspect of the present invention.

The twenty-third present invention is a program that causes a computer to perform functions as the reproducing unit that extracts said reproduction management information from said flash memory, and based on said record management information and said reproduction management information, extracts, from said recording medium, signals after signals corresponding to said reproduction middle information included in said reproduction management information, of the reproducing apparatus according to the fourth aspect of the present invention.

The twenty-fourth present invention is a recording medium that stores the program according to the twenty-second or the twenty-third present invention, and is computer-executable.

The twenty-fifth present invention is a data structure, wherein signals having same contents are compressed in a plurality of different conditions and are independently recorded on a recording medium, the data structure being capable of recording record management information that denotes a mutual association between said signals that have the same contents but are compressed in a plurality of different conditions, and reproduction management information including reproduction middle information that denotes middle of reproduction of signals from a recording medium, in correspondence to said record management information.

To solve the above problems, the first aspect of the invention is a reproducing apparatus comprising:

a reproducing section picking up any signals compressed in a plurality of different compression methods from a recording medium which records said signals compressed in the plurality of different compression methods and record management information denoting each other's association of said signals compressed in the plurality of different compression methods, respectively;

a decoding section decoding said signal picked up from the recording medium; and a recording section recording reproduction management information including reproduction-interruption information in said reproducing section associated with said record management information onto said recording medium.

The second aspect of the invention is the reproducing apparatus according to the first aspect of the invention, wherein said reproduction-interruption information is elapsed time from start of reproduction of said signal.

The third aspect of the invention is the reproducing apparatus according to the first aspect of the invention, which is driven by a battery.

The forth aspect of the invention is the reproducing apparatus according to the first aspect of the invention, which is suitable for displaying a signal decoded from the signal compressed in MPEG2.

The fifth aspect of the invention is a reproducing apparatus comprising a reproducing section picking up any of signals compressed in a plurality of different compression methods, record management information denoting each other's association of said signals compressed in the plurality of different compression methods, and said reproduction management information recorded by the reproducing apparatus according to the first aspect of the invention from a recording medium which records said signals compressed in the plurality of different compression methods, said record management information, and said reproduction management information, respectively; and a decoding section decoding said any of the signals picked up from the recording medium;

wherein said any of the signals picked up from the recording medium is suitable for said reproducing section and/or said decoding section, said reproducing section picks up a signal subsequent to the signal corresponding to said reproduction-interruption information included in said reproduction management information from said recording medium based on said record management information and said reproduction management information.

The sixth aspect of the invention is the reproducing apparatus according to the fifth aspect of the invention, wherein said plurality of different compression methods are MPEG2 and MPEG4, said record management information is information which associates said signal compressed in MPEG2 with said signal compressed in MPEG4, a compression method for said signal subsequent to the signal corresponding to said reproduction-interruption information is different from a compression method for the signal that reproduced by the reproducing apparatus according to the first aspect of the invention.

The seventh aspect of the invention is a recording apparatus which records signals compressed in a plurality of different compression methods and record management information denoting each other's association of said signals compressed in a plurality of different compression methods onto a recording medium.

The eighth aspect of the invention is the recording apparatus according to the seventh aspect of the invention, wherein said recording section records said signal compressed in MPEG2 and said signal compressed in MPEG4 as alternatively aligned stream onto said recording medium.

The ninth aspect of the invention is the recording apparatus according to the eighth aspect of the invention, wherein said signal stream compressed in MPEG2 including at least a first predetermined continuous data area is recorded onto said recording medium, and said signal stream compressed in MPEG4 including at least a second predetermined continuous data area is recorded onto said recording medium.

The tenth aspect of the invention is the recording apparatus according to the ninth aspect of the invention, wherein said recording medium is an optical disc or a magnetic disc, and the reproducing section of the reproducing apparatus picking up the signal recorded on said recording medium according to the first or the fifth aspect of the invention includes a head picking up the signal from said recording medium, wherein said first or second predetermined continuous data area is represented by $$Vo \times Tj \times Vr/(Vr-Vo)$$ [Equation 1]

(Vo: a transfer rate of said each signal from the head (Mbps), Tj: the maximum seek time of said head (second), Vr: a data-reading rate of said each signal from said recording medium to said head (Mpbps)).

The eleventh aspect of the invention is the recording apparatus according to the tenth aspect of the invention, wherein said recording section records said signal stream compressed in MPEG2 and said signal stream compressed in MPEG4 onto said recording medium so that time for reproducing said signal stream compressed in MPEG2 equals to time for reproducing said signal stream compressed in MPEG4 in said reproducing section.

The twelfth aspect of the invention is a recording and reproducing method comprising steps of recording signals compressed in a plurality of different compression methods and record management information denoting each other's association of said signals compressed in the plurality of different compression methods onto a recording medium;

picking up any of said signals from said recording medium;

recording reproduction management information including reproduction-interruption information associated with said record management information onto said recording medium;

picking up said record management information and said reproduction management information from said recording medium, which records said reproduction management information;

picking up a signal subsequent to the signal corresponding to said reproduction-interruption information included in said reproduction management information from said recording medium which records said reproduction management information, based on said record management information and said reproduction management information;

decoding said signal subsequent to the signal corresponding to said reproduction-interruption information, wherein said signal subsequent to the signal corresponding to said reproduction-interruption information is suitable for said picking up step and/or said decoding step.

The thirteenth aspect of the invention is a program for causing a computer to perform as a reproducing section picking up said any of signals and a decoding section for decoding said signal picked up from the recording medium in the reproducing apparatus according to the first aspect of the invention.

The fourteenth aspect of the invention is a program for causing a computer to perform as a reproducing section picking up said any signals, said record management information, and said reproduction management information from the recording medium; and a decoding section for decoding said signal picked up from the recording medium in the reproducing apparatus according to the fifth aspect of the invention.

The fifteenth aspect of the invention is a recording medium executable by a computer storing the program according to the thirteenth or the fourteenth aspect of the invention.

The sixteenth aspect of the invention is a data structure capable of recording signals compressed in a plurality of different compression methods separately, and of recording management information denoting association of said signals compressed in a plurality of different compression methods with each other and reproduction-interruption information associated with said management information in reproduction.

According to the present invention, it is possible to provide a reproducing apparatus capable of playing video and/or audio suitably for a condition of each playing mode even when a previously specified playing mode is changed.

BRIEF DESCRIPTION OF DRAWINGS

FIG. 7 is a diagram showing a construction of a time-information file formed by an AV data recording and reproducing apparatus according to an embodiment of the present invention.

EXPLANATION OF REFERENCE NUMERALS

100 Video Signal Input Section
101 MPEG2 Compressing Section
102 Audio Signal Input Section
103 MPEG4 Compressing Section
110 Video Signal Output Section
111 MPEG2 Decoding Section
112 Audio Signal Output Section
113 MPEG4 Decoding Section
130 Pickup
131 DVD-RAM Disc
143 Logic Block Management Section
320 Recording Section
321 Reproducing section
340 Continuous-Data-Area Detecting Section
341 Record Control Section
342 Reproducing Control Section

BEST MODE FOR CARRYING OUT THE INVENTION

Figure 1:
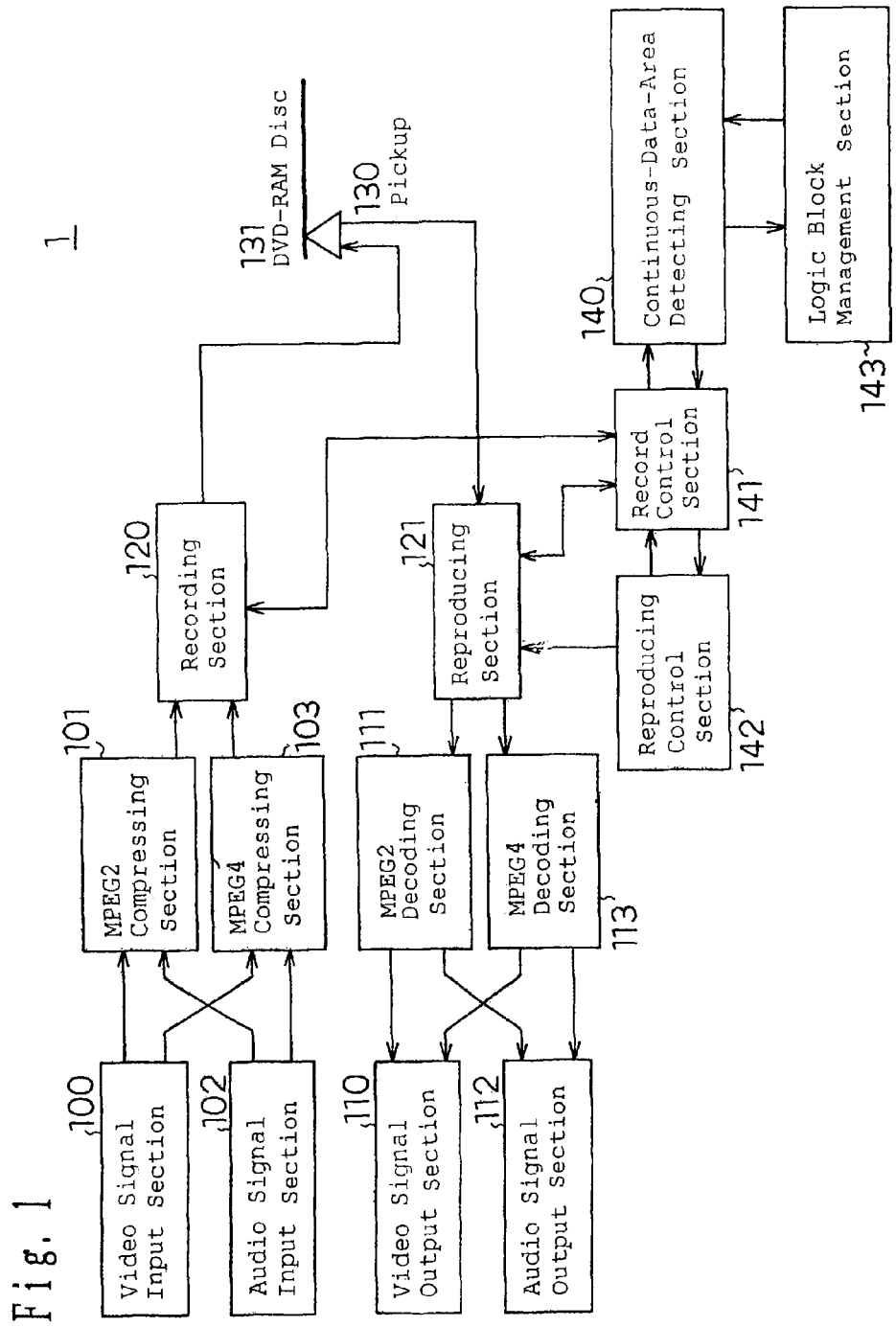
FIG. 1 is a block diagram showing an AV data recording and reproducing apparatus according to an embodiment of the present invention.

The following description will describe embodiments according to the present invention with reference to drawings. FIG. 1 is a block diagram showing an AV data recording and reproducing apparatus 1 as one embodiment of a reproducing apparatus according the present invention. In FIG. 1, signals provided from a video signal input section 100 and an audio signal input section 102 are compressed by an MPEG2 compressing section 101, and a program stream including an MPEG2 video stream is formed. In addition, the same signals are compressed by an MPEG4 compressing section 103, and an MP4 stream including an MPEG4 video stream is formed. Each of these compressed signals is separately written into a DVD-RAM disc 131, which is one example of a recording medium according to the present invention, through a recording section 120 and a pickup 130. In the MPEG4 compressing section 103, the video signal is compressed after its pixel number is reduced in ¼. Here, a bit rate of the program stream, which is provided by the MPEG2 compressing section 101, is approximately 9 Mbps, a bit rate of the MP4 stream, which is provided by the MPEG4 compressing section 103, is approximately 0.5 Mbps as one example.

In reproduction, either one of the program stream including the MPEG2 video stream and the MP4 stream including the MPEG4 stream is played based on user's selection. Concretely, when the program stream is picked up through the pickup 130 and a reproducing section 121, which is one example of a reproducing section according to the present invention, it is decoded into a video signal and an audio signal by the MPEG2 decoding section 111, and the decoded signals are provided to a video signal output section 110 and an audio signal output section 112. In addition, when the MP4 stream is picked up, it is decoded into a video signal and an audio signal by the MPEG4 decoding section 113, and the decoded signals are provided to a video signal output section 110 and an audio signal output section 112.

Figure 2:
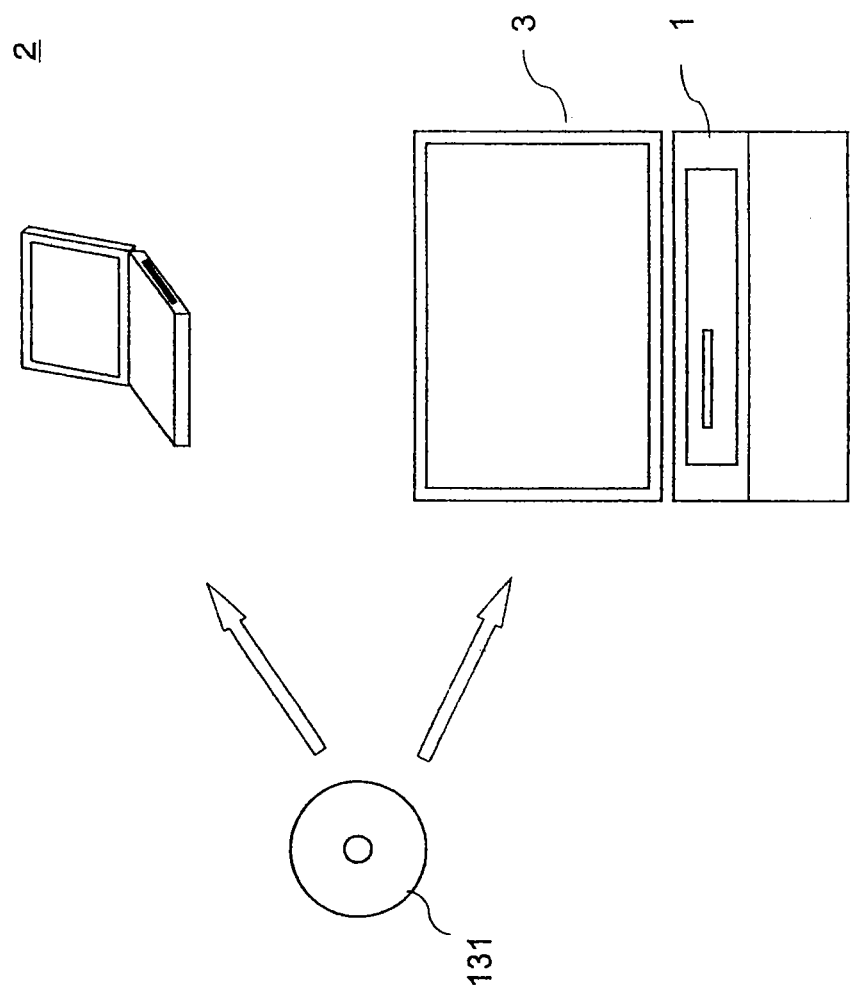
FIG. 2 is a schematic view showing an example of usage of an AV data recording and reproducing apparatus according to an embodiment of the present invention.

FIG. 2 is a view for explanation schematically showing an example of usage of the AV data recording and reproducing apparatus 1 according to an embodiment of the present invention. A portable video player 2 is another example of the reproducing apparatus according to the present invention. Its construction is similar to the construction of the AV data recording and reproducing apparatus 1, therefore, its description is omitted for ease of explanation. The portable video player 2 includes a battery (not shown), and can be also driven by the battery. When either one of the AV data recording and reproducing apparatus 1 and the portable apparatus 2 interrupts playing the DVD-RAM disc 131, which records the above program stream and the MP4 stream, at some midpoint, the other apparatus can play the subsequent video from the some midpoint in the most suitable mode for the apparatus.

Figure 3:
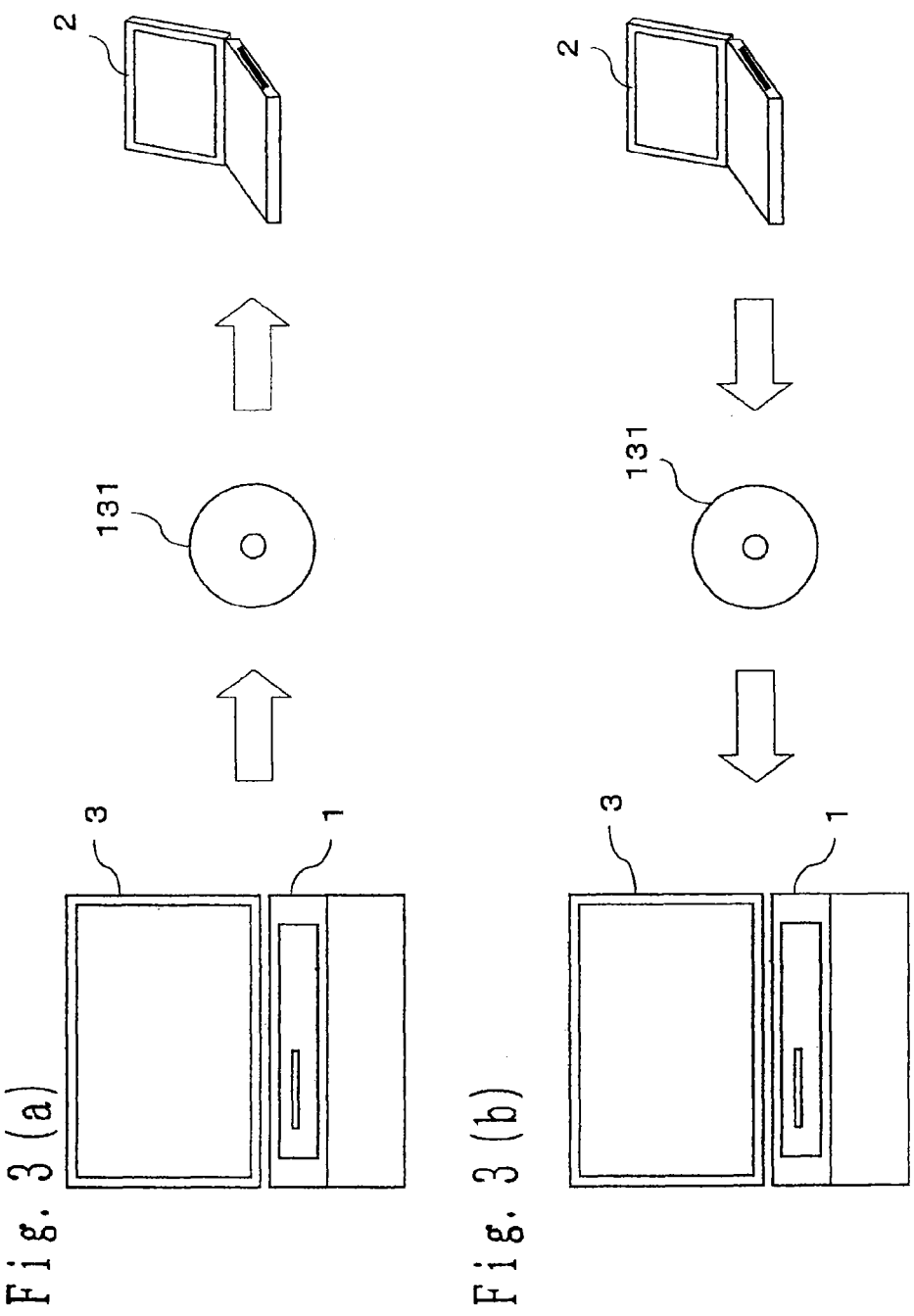
FIGS. 3(a) and 3(b) are schematic views for showing a usage pattern of an AV data recording and reproducing apparatus according to an embodiment of the present invention.

Concretely, even when the user interrupts playing a broadcast program indoors recorded on the DVD-RAM disc at some midpoint on the AV data recording and reproducing apparatus 1, he or she can play the subsequent program from the some midpoint on the portable player 2 with reducing exhaustion of the battery as shown in FIG. 3(a).

Additionally, on the other hand, even when the user interrupts playing the broadcast program outdoors recorded on the DVD-RAM disc 131 at some midpoint on the portable video player, he or she can play the subsequent program from the some midpoint on the AV data recording and reproducing apparatus 1 in high image quality, as shown in FIG. 3(b).

Next, the following description describes a concrete operation of the AV data recording and reproducing apparatus 1 according to the embodiment. As shown in FIG. 4(a), the program stream including the MPEG2 video stream (hereinafter referred to as a "full-video stream") is recorded onto the DVD-RAM disc 131 as a full-video file MOV001.MPG. In this time, a time-information file associated with the full-video file is also recorded. In addition, the MP4 stream including the MPEG4 video stream (hereinafter referred to as a "mini-video stream") is recorded onto the DVD-RAM disc as a mini-video file MOV001.MP4. Here, time-information associated with the mini-video stream is recorded into a header of the mini-video file.

Figure 4:
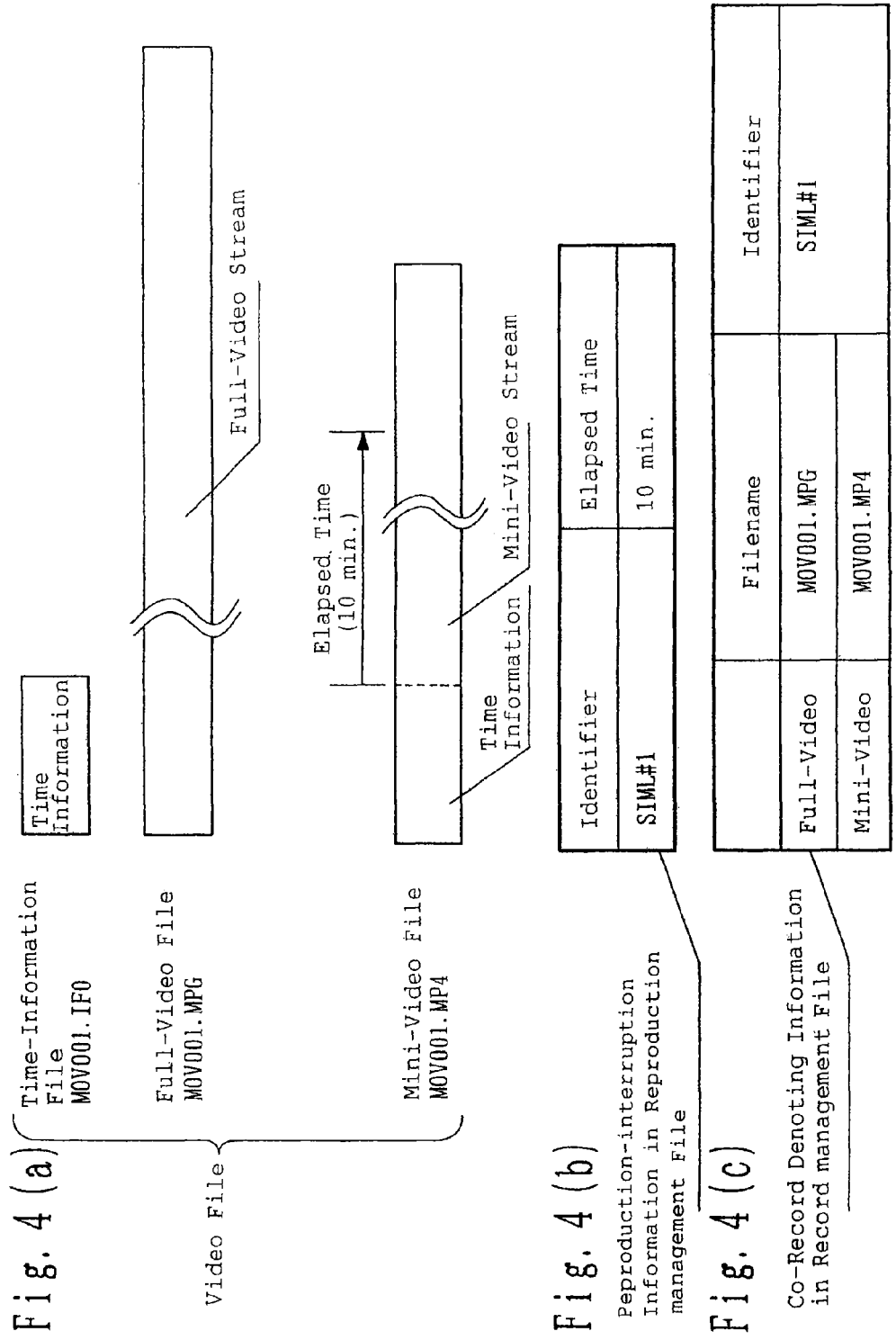
FIGS. 4(a)-4(c) are diagrams for showing a recording form of an AV data recording and reproducing apparatus according to an embodiment of the present invention.

Thus, the same video signal and the same audio signal are recorded in different bit rates and different numbers of pixels as separated files, and co-record denoting information is stored as record management information including both filenames in a record management file as shown in FIG. 4(c). In addition, an identifier for identifying the program (SIML#1, in an example of FIG. 4) is also recorded. Accordingly, it is possible to identify which program is stored into which two video files. Thus, in the case that the recorded broadcast program is played, when the portable player 2 is used outdoors, for example, the mini-video file is selectively or automatically reproduced and decoded. Subsequently, the user plays the recorded broadcast program on a relatively small, about three-inch of liquid-crystal display (plays a role as a part of the video signal output section 110) and a pair of headphones (plays a role as a part of the audio signal output section 112). Additionally, when it is played by connecting the AV data recording and reproducing apparatus 1 to a large display TV 3, the full-video file is selectively or automatically reproduced and decoded.

Next, the following description describe the operation in the case that the portable video player 2 plays the subsequent program, which is recorded on the DVD-RAM disc 131, from some midpoint, outdoors after the program is played with the large display TV 3 up to the some midpoint indoors.

When the AV data recording and reproducing apparatus 1 stops playing the broadcast program recorded on the DVD-RAM disc 131 at some midpoint before playing it all, the reproducing section 121 conveys the stop to the recording section 120 thorough a record control section 141. The recording section 120 records elapsed time from the beginning of the program onto the DVD-RAM disc 131 as reproduction-interruption information. For example, in the case that the program is interrupted playing the program at 10 minutes from the beginning, the recording section 120 records a value 10 minutes and the identifier of the played broadcast program as the reproduction-interruption information into the reproduction management file as shown in FIG. 4(b).

After that, when the user goes out outdoors and resumes playing the subsequent program from the some midpoint on the portable video player 2, he or she inserts the DVD-RAM disc 131, which was ejected from the AV data recording and reproducing apparatus 1, into the portable video player 2. Then, an operation with the mini-video file to be played by the portable video player 2 is selected by the user, or is automatically selected. Subsequently, the reproducing section 121 reads the reproduction-interruption information from the DVD-RAM disc 131. The reproduction-interruption information is transferred to a reproduction control section 142. The reproduction control section 142 quickly retrieves the filename of the mini-video file based on the identifier of the broadcast program included in the reproduction-interruption information as a key. Further, the reproduction control section 142 detects the some midpoint of the reproduction interruption in the corresponding mini-video file based on the elapsed time included in the reproduction-interruption information and the time information included in the header of the mini-video file. Consequently, the reproduction control section 142 instructs the reproducing section 121 to reproduce the corresponding mini-video file from the some midpoint of the reproduction interruption.

According to the above operation, even when the user interrupts playing a broadcast program recorded on the DVD-RAM disc 131 at some midpoint on the AV data recording and reproducing apparatus 1 indoors, he or she can play the subsequent program from the some midpoint on the portable player 2 with remarkably reducing the power consumption.

As compared the case that a full-video file of 9 Mbps, which is recorded on a DVD-RAM having a transferring rate of 24 Mbps, is reproduced with the case that a mini-video file of 1 Mbps is reproduced, the reproduction and decoding of the mini-video file requires its power consumption as little as ¼ of that of the reproduction and decoding of the full-video file, for example. That is, in terms of reduction for power consumption in the reproducing section 121 and/or the decoding sections 111 and 113, the signal compressed in MPEG4, which is picked up from the recording medium, is suitable. In other words, the signal compressed in MPEG4 is suitable for reproduction in a portable device.

In addition, on the other hand, the following description describes the operation in the case that the AV data recording and reproducing apparatus 1 plays the subsequent program, which is recorded on the DVD-RAM disc 131, from some midpoint, indoors after the portable video player 2 interrupts playing it at the some midpoint outdoors.

When the portable player 2 interrupts playing the broadcast program recorded on the DVD-RAM disc 131 at some midpoint before playing it all, the reproducing section 121 conveys the interruption to the recording section 120 thorough the record control section 141. The recording section 120 records elapsed time from the beginning of the program onto the DVD-RAM disc 131 as reproduction-interruption information. For example, in the case that the program is interrupted playing at 10 minutes from the beginning, the recording section 120 records a value 10 minutes and the identifier of the played broadcast program as the reproduction-interruption information into the reproduction management file as shown in FIG. 4(b).

After that, when the user returns home and plays the subsequent program again from the some midpoint, he or she ejects the DVD-RAM 131 from the portable video player 2 and inserts it into the AV data recording and reproducing apparatus 1. Then, the full-video file to be played by the AV data recording and reproducing apparatus 1 is selected by the user, or is automatically selected. Subsequently, the reproducing section 121 reads the reproduction-interruption information from the DVD-RAM disc 131. The reproduction-interruption information is transferred to the reproduction control section 142. The reproduction control section 142 quickly retrieves the filename of the full-video file based on the identifier of the broadcast program included in the reproduction-interruption information as a key. Further, the reproduction control section 142 detects the some midpoint of the reproduction interruption in the corresponding full-video file based on the elapsed time included in the reproduction-interruption information and the time information file MOV001.IFO. Consequently, the reproduction control section 142 instructs the reproducing section 121 to reproduce the corresponding full-video file from the some midpoint of the reproduction interruption.

According to the above operation, even when the user interrupts playing a broadcast program recorded on the DVD-RAM disc 131 at some midpoint on the portable player 2 outdoors, he or she can play the subsequent program from the some midpoint on the AV data recording and reproducing apparatus 1. In this case, since the signal compressed in MPEG2 is suitable for display on a large display when decoded, it is possible to play the program in high-resolution image quality.

Additionally, when the user plays the subsequent program from the some midpoint on either of the apparatuses, the user can easily play the subsequent program from the some midpoint without complicated operation such as giving the filename of the full-video file (or of the mini-video file) and skipping files up to the some midpoint where playing is interrupted.

Figure 5:
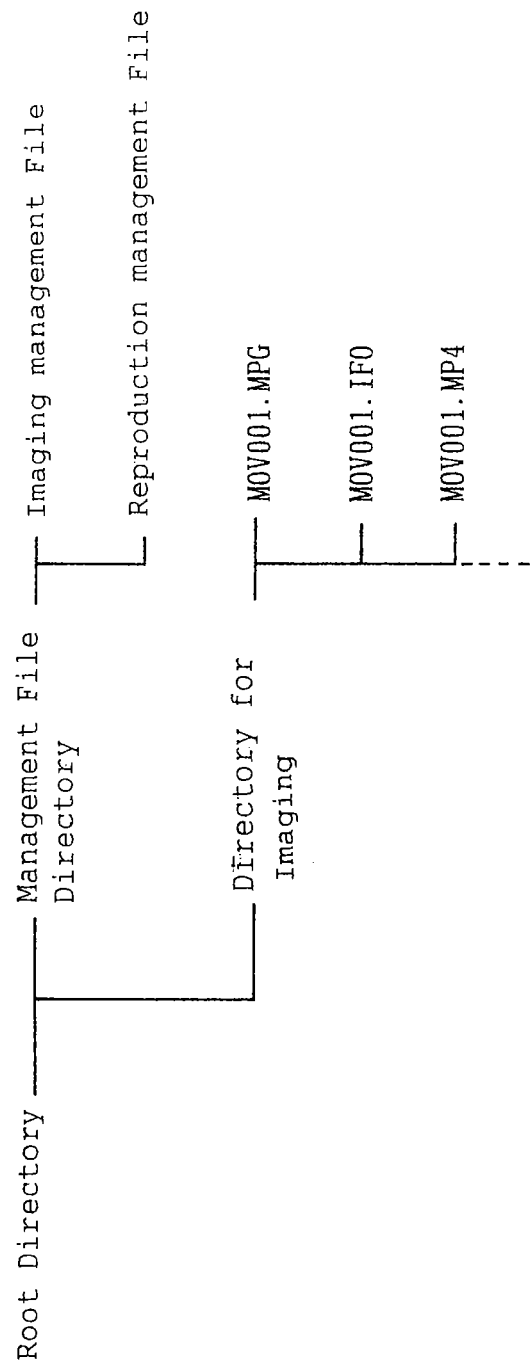
FIG. 5 is a diagram for showing a recording form of an AV data recording and reproducing apparatus according to an embodiment of the present invention.

FIG. 5 shows one example of a directory construction of the above full-video file, mini-video file, time-information file, record management file, and the reproduction management file.

Figure 6:
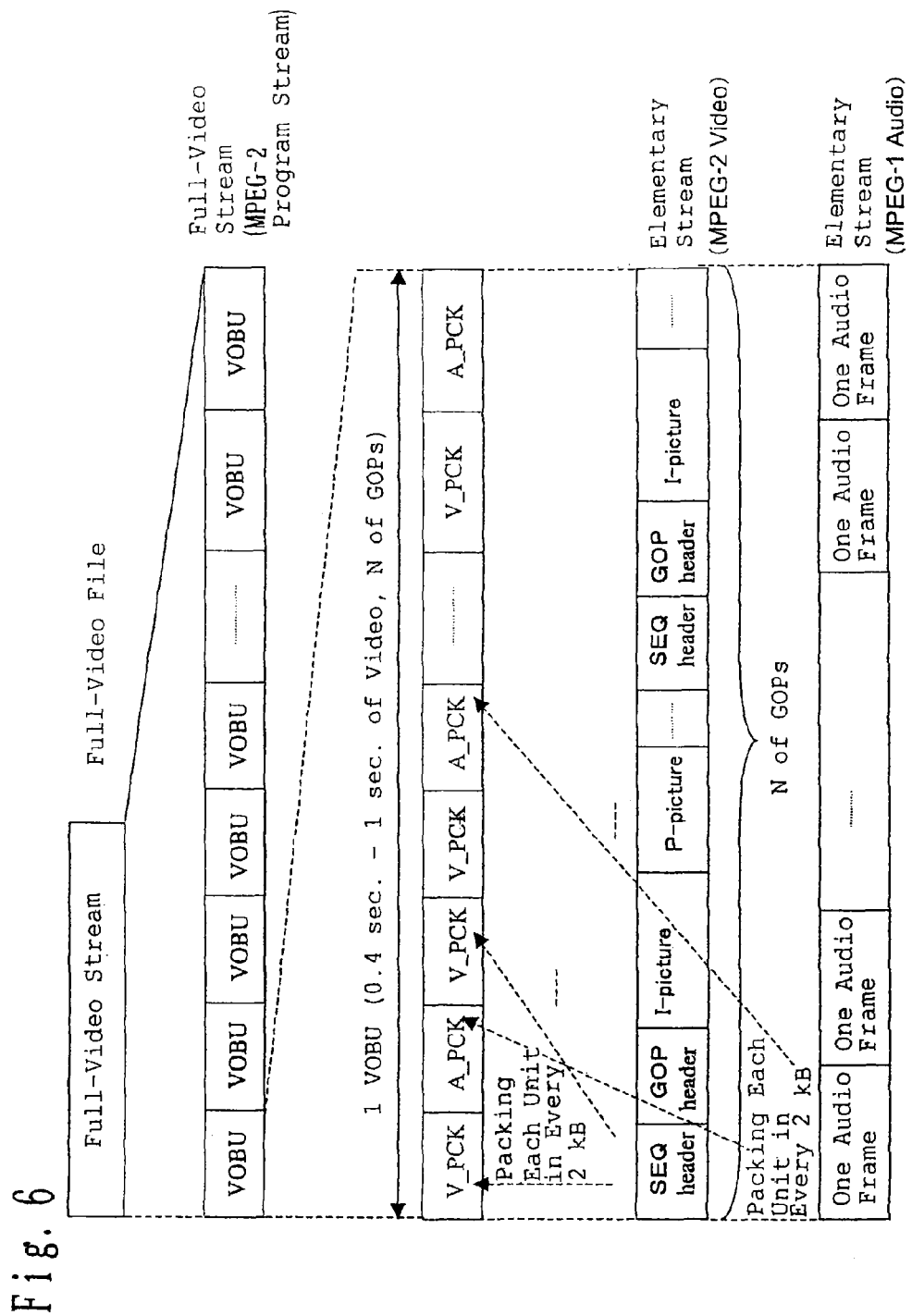
FIG. 6 is a diagram showing a construction of a full-video stream formed by an AV data recording and reproducing apparatus according to an embodiment of the present invention.

FIG. 6 shows one example of a construction of the full-video file (MOV001.MPG), which is recorded on the DVD-RAM 131. The DVD-RAM 131 includes 2 k bytes of sectors. A logic block includes 16 sectors. The full-video image is recorded onto the DVD-RAM 131 with an error-correction code added with respect to each of the logic block. In addition, physically continuous logic blocks corresponding to more than or equal to 11 seconds in terms of the maximum recording rate is allocated as one continuous data area. A video packet unit (Video OBject UNIT: hereinafter referred to as a "VOBU"), which consists of 0.4-1 seconds of MPEG stream, is sequentially recorded into the area. One VOBU consists of packs, which are 2 k bytes of units and are classified in low classification of the MPEG program stream. There are two types of packs. One is a video pack (V_PCK), which stores compressed-video data. Another is an audio pack (A_PCK), which stores compressed-audio data. Additionally, one VOBU includes all of V_PCKs for corresponding time. Moreover, one VOBU includes all of A_TSPS including audio frames required for timing. That is, the video frames and the audio frames are completed in the VOBU packs.

The continuous-data-area detecting section 340 detects a next continuous data area again when the rest of one continuous data area becomes less than 3 seconds in terms of the maximum recording rate. Then, when one continuous data area becomes full, the recording section 120 writes into the next continuous data.

FIG. 7 shows an example of a construction of the time-information file MOV001.IFO. The time information, which denotes association between the elapsed time from the file head and data address (the number of packs) from the file head in reproduction of the full-video stream, is stored as time-information file MOV001.IFO into the recording medium 131 separately from the full-video file.

Figure 8:
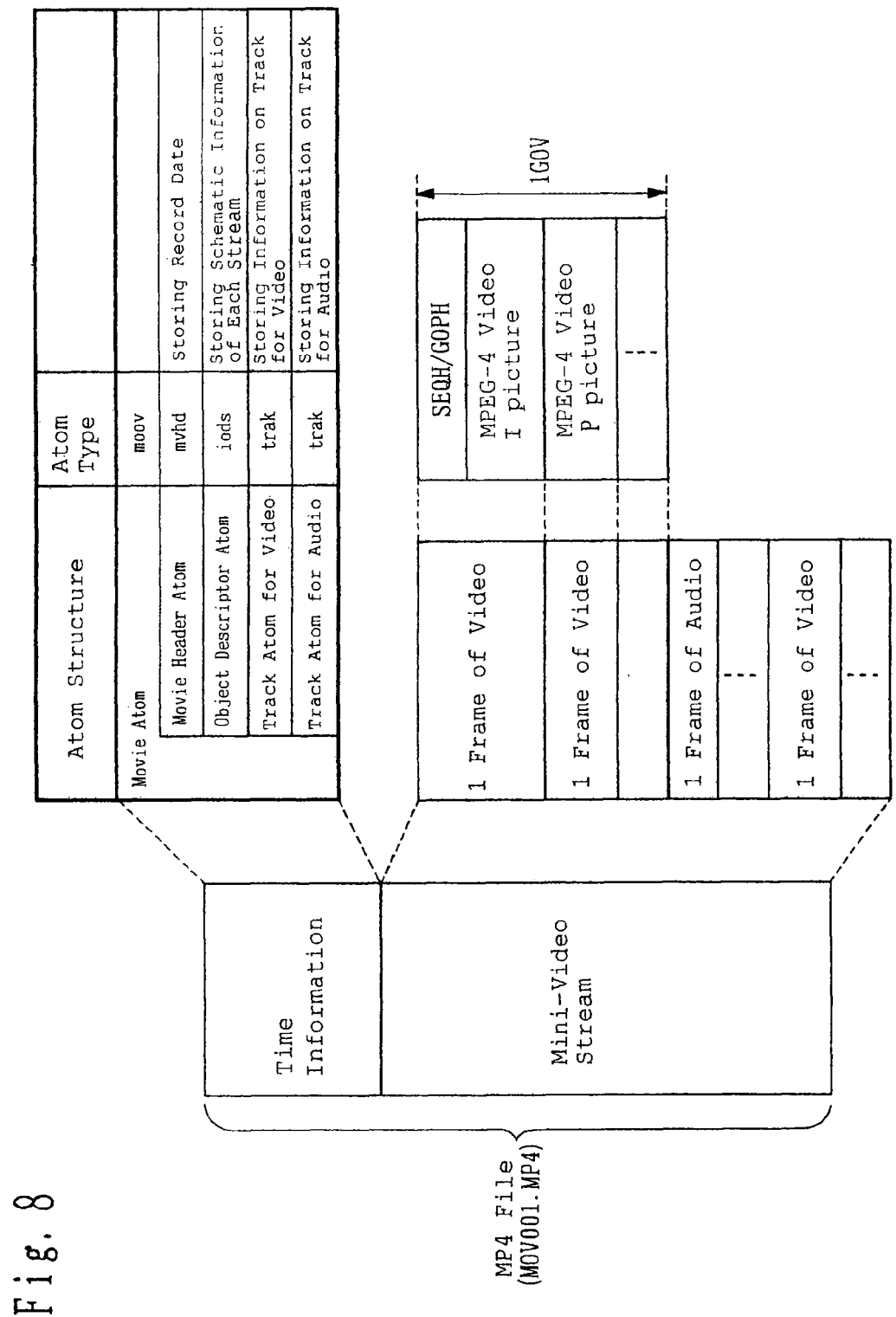
FIG. 8 is a diagram showing a construction of a mini-video file formed by an AV data recording and reproducing apparatus according to an embodiment of the present invention.
Figure 9:
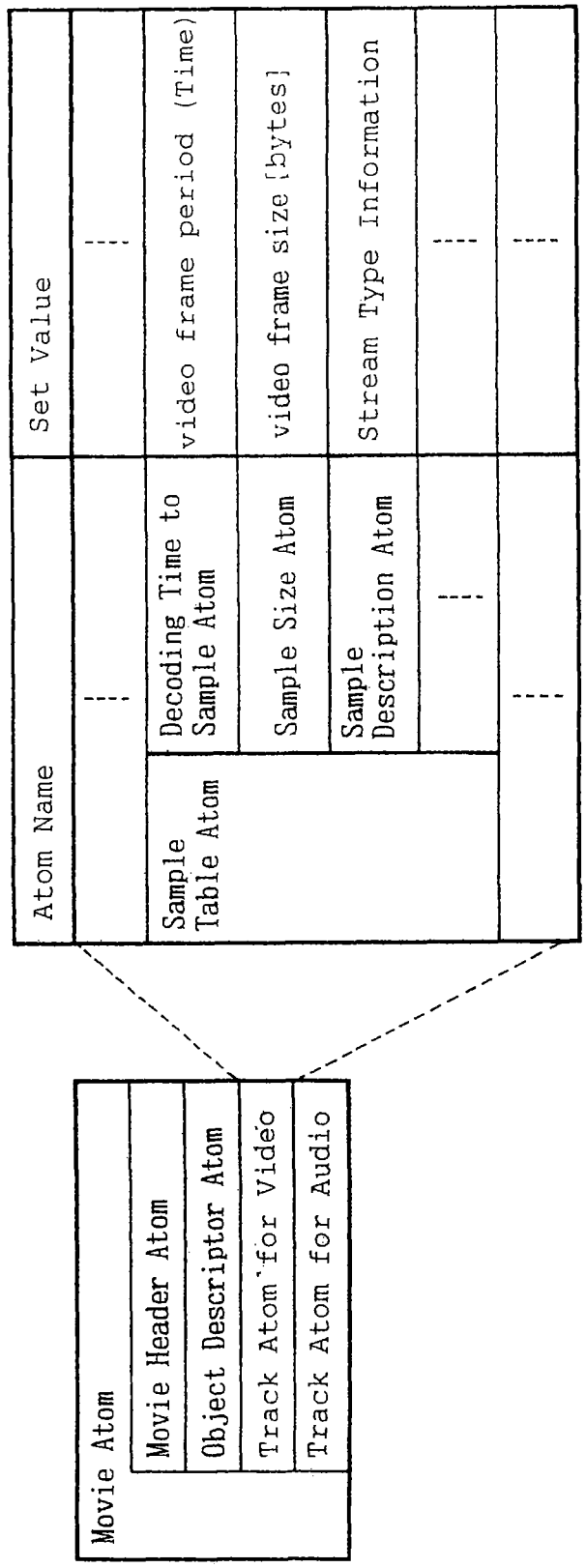
FIG. 9 is a diagram showing a time-information file of a mini-video file formed by an AV data recording and reproducing apparatus according to an embodiment of the present invention.

On the other hand, the mini-video stream is recorded as mini-video file MOV001.MP4 into the DVD-RAM 131. FIG. 8 shows an example of a construction of the mini-video file. In the mini-video file, time information, which denotes the elapsed time from the file head and data address from the file head in reproduction, is stored in the header section of the file. The header of the MP4 file consists in a data structure, so-called an atom structure and stores various attributes. As shown in FIG. 9, the time information is stored in "Sample Table Atom".

The reproduction control section 142 can easily detect the address storing the respective video files, for example, corresponding to the video at 10 minutes from the beginning based on the time information. In an example shown in FIG. 7, VOBU reproduction time (the number of the fields) corresponding to the elapsed time is calculated as one example, and VOBU data size corresponding to the cumulative value is determined, for example. In addition, in an example shown in FIG. 9, a video frame period (time) corresponding to the elapsed time is calculated, and video frame size (the number of bytes) corresponding to this is determined. According to such operation, the address of the signal subsequent to the some midpoint where playing is interrupted is determined. Here, the time information stored in the time-information file MOV001.IFO and the time information stored in the header of the mini-video file play a role as one example of the record management information according to the present invention.

Additionally, the file head of each video file is defined by the location at the beginning of the video signal and the audio signal.

Figure 10:
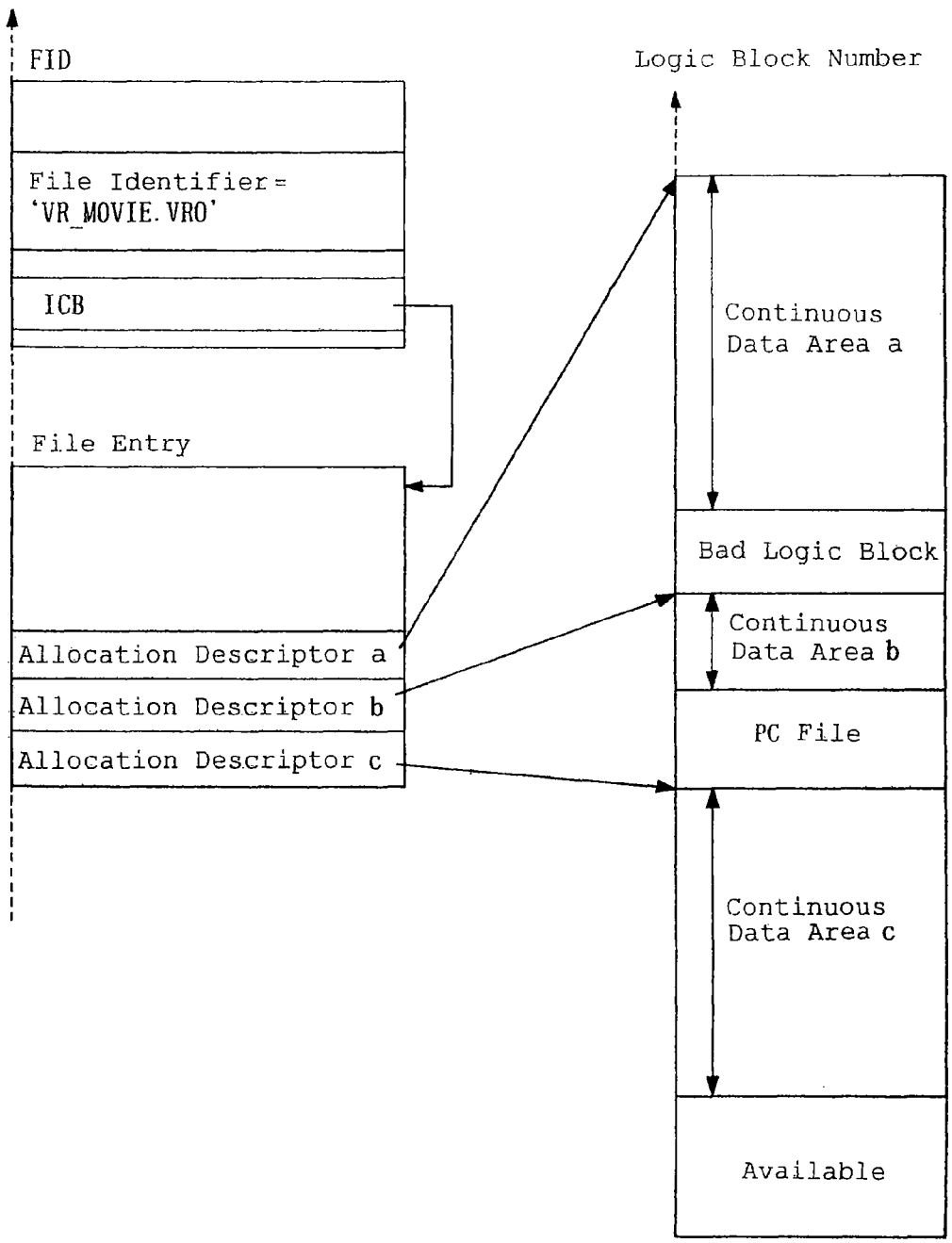
FIG. 10 is a diagram showing each video stream formed by an AV data recording and reproducing apparatus according to an embodiment of the present invention.

FIG. 10 shows mode that the record contents in the DVD-RAM disc 131 are managed by a UDF (Universal Disk Format) file system or by an ISO/IEC 13346 (Volume and file structure of write-once and rewritable media using non-sequential recording for information interchange) file system. In FIG. 10, one continuously recorded MPEG program stream is recorded as a file VR_MOVIE.VRO. In this file, its filename and the location of its file entry are managed by an FID (File Identifier Descriptor). In addition, the filename is written in a "File Identifier" column as "VR_MOVIE.VRO", and the location of the file entry is written in an "ICB" column as a top sector number.

Besides, the UDF standards are equivalent to the implementation standard of the ISO/IEC 13346 standard. In addition, a file written in compliant with the UDF format can be handled as one file also from a PC in the case that a DVD-RAM drive is connected to the PC through the 1394 interface and a SBP-2 (Serial Bus Protocol) protocol.

Additionally, the file entry manages the continuous data areas (CDAs) a, b, and c, which store data, with an allocation descriptor. Concretely, when detecting a bad logic block during recording into the continuous data area a, the recording control section 341 skips said logic block and continues to write from the top of the continuous data area b. Next, when detecting a conflict with a record area of the PC file during recording into the continuous data area b, the recording control section 341 skips said logic block and continues to write from the head of the continuous data area c. Consequently, the file VR_MOVIE.VRO consist of the continuous data areas a, b, and c.

In addition, in the regulation for description of the allocation descriptor, the top location of the data, to which the allocation descriptors a, b, and c access, should equals to the head of the sector, and the data size of the data, to which the allocation descriptors a, and b other than the last allocation descriptor c access, should be an integral multiple of one sector.

Additionally, the data size of one VOBU varies in the range less than or equal to the maximum recording rate if the video has a variable bit rate. The data size of one VOBU is almost constant if the video has a fixed bit rate.

Moreover, data-reading from a phase change type optical disc such as the DVD-RAM 131 and data-output to the MPEG2 decoding section are performed in parallel in reproduction of recorded contents. In this case, its control is performed so that the rate of data-reading is faster than the rate of data-output so that data to be reproduced may not run out. Accordingly, in the case that continuous data-reading and continuous data-output are kept, superfluous data to be output can be reserved according to the rate difference between the rate of data-reading and the rate of data-output. That is, continuous reproduction can be achieved by using the reserved superfluous data as output data during temporal stop caused by a jump of the pickup 130.

Concretely, in the case that the rate of data-reading from the DVD-RAM 131 is 11 Mbps, the maximum rate of data-output to the MPEG2 decoding section is 8 Mbps, and the maximum moving time of the pickup 130 is 3 seconds, 24 Mbits of data corresponding to moving of the pickup 130 is required as the superfluous output data. Continuous reading for 8 seconds is necessary to ensure the superfluous data. That is, continuous picking up during a period, which is obtained by dividing 24 Mbits by the difference between the rate of data-reading 11 Mbps and the rate of data-output 8 Mbps, is necessary.

Accordingly, since 88 Mbits or 11 seconds of output data is read during continuous reading for 8 seconds, reserving more than or equal to 11 seconds of continuous data area can ensure continuous reproduction.

In addition, several bad logic blocks may be included in the continuous data area. However, in this case, it is necessary to reserve a bit more than 11 seconds of continuous data area for additional time necessary to read the bad logic blocks in reproduction.

Figure 11:
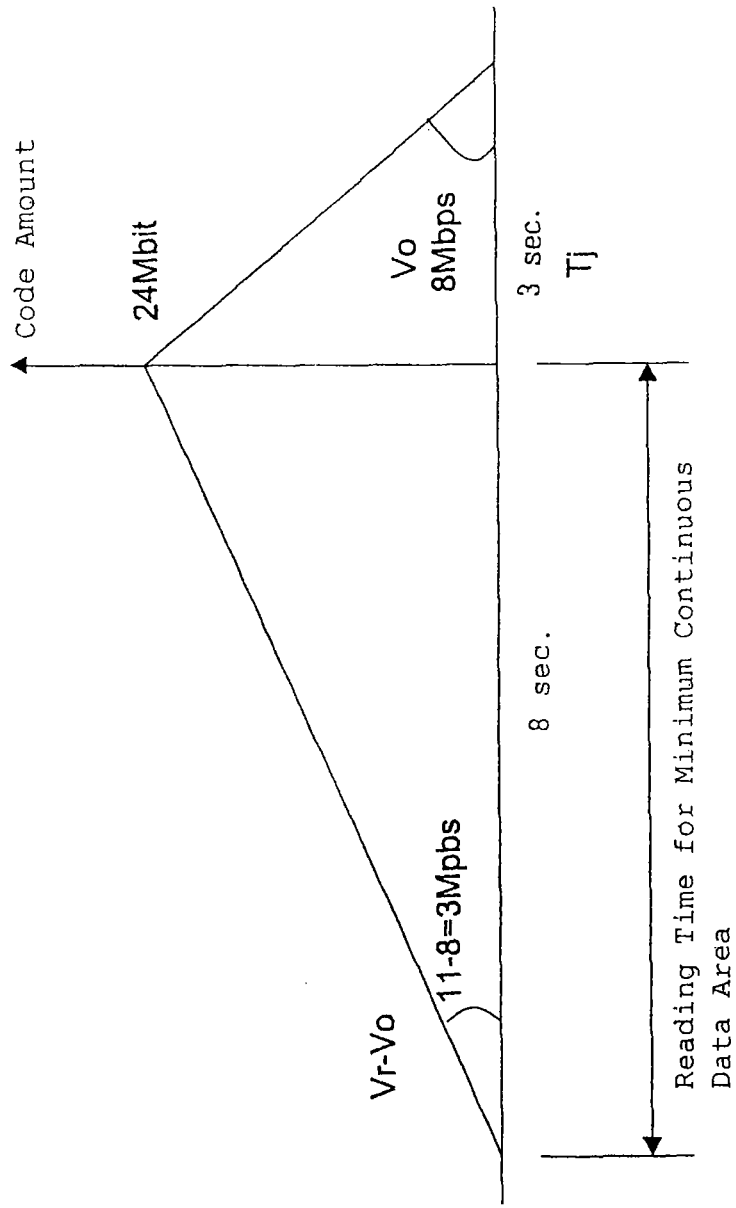
FIG. 11 is a diagram for showing a continuous data area of a stream of video image formed by an AV data recording and reproducing apparatus according to an embodiment of the present invention.
Figure 12:
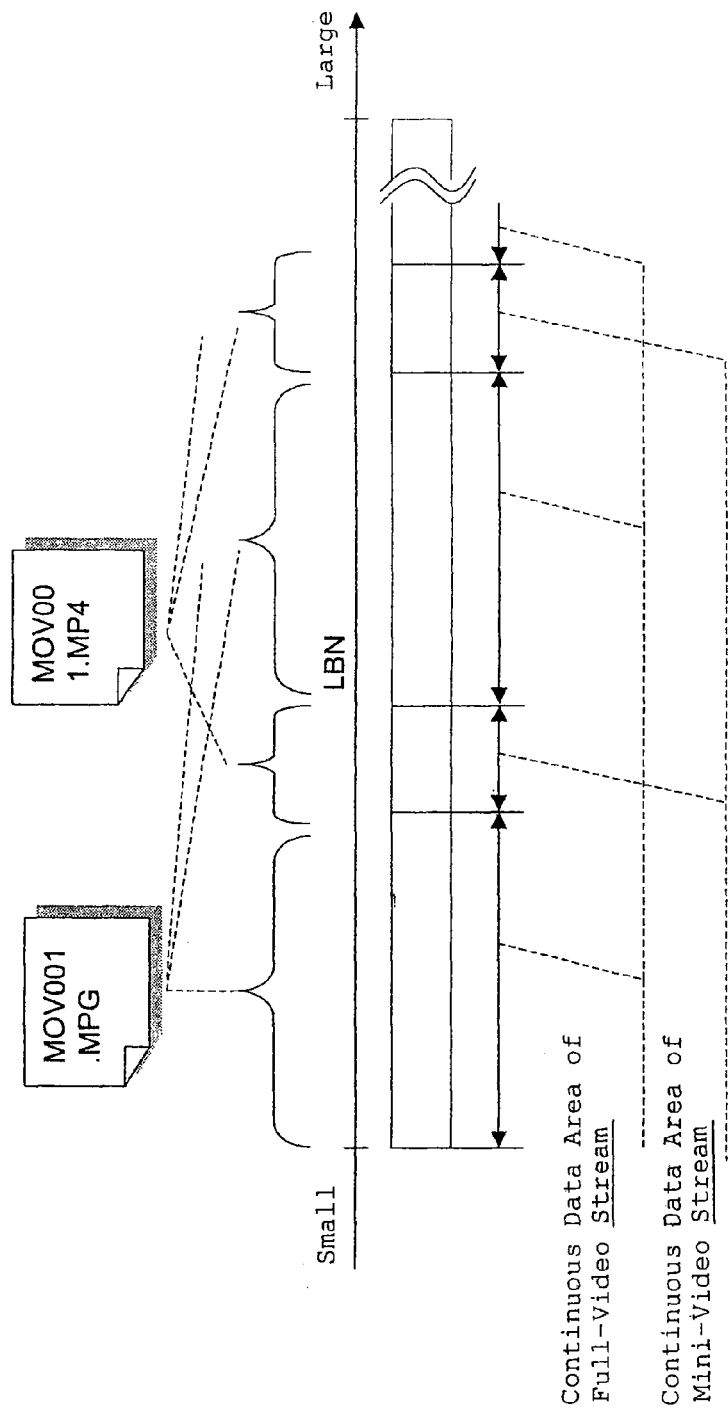
FIG. 12 is a diagram for showing continuous data of a stream of video image formed by an AV data recording and reproducing apparatus according to an embodiment of the present invention.

To generalize the above explanation, the minimum size of the continuous data area is represented by $$\text{Minimum Size of Continuous Data Area} = Vo \times Tj \times Vr / (Vr - Vo) \quad \text{[Equation 2]}$$

where Tj (second) is the maximum seek time of the pickup 130, Vo (Mbps) is a data-output rate to the MPEG2 decoding section, and Vr (Mbps) is a data-reading rate of the pickup 130. Here, Vo and Vr vary according to MPEG2 and MPEG4. A first predetermined continuous data area according to the present invention and a second predetermined continuous data area according to the present invention, which are the minimum size of adequate continuous data area, are determined for the respective compression methods. Additionally, FIG. 11 shows the relationship of the above equation. Since the continuous data area is determined as mentioned above, it is possible to pick up each part of data without freezing even in the case that two video streams are alternatively recorded as shown in FIG. 12.

Here, the continuous data area that ensures continuous data reproduction in MPEG2 is larger than in MPEG4. Accordingly, 11-12 seconds of full-video data that ensures continuous data reproduction in MPEG2 and similarly 11-12 seconds of mini-video data are alternatively recorded so that both video data can be reproduced continuously. In addition, in this case, since the mini-video is recorded in a longer unit for 11-12 seconds, a seeking process of pickup can be often eliminated. Therefore, it is possible to shorten video-output delay time of each frame of the mini-video. Since the mini-video has small data size, all data can be located in the memory. Accordingly, it is possible to smoothly reproduce at high speed (for example, double speed reproduction) by using all recorded frames. In the similar case of the full-video, its data size is so large that it is difficult to locate the frame data in the memory. Therefore, since specific frames (for example, only I frame) in the memory are reproduced in the high speed reproduction, its smoothness is poor as compared with the mini-video. Additionally, since mini-video has small data size, it is possible to reproduce at normal speed or double speed and so on in the reverse direction. Moreover, special reproduction such as reproducing frame-by-frame advance or return can be easily performed at high speed when data is located in the memory.

However, in this case, it is preferable that the video data and the mini-video data as a pair of two continuous data areas are located without separating physically in the pair. In addition, it is preferable that the continuous data area of the mini-video data is located in physically upstream side than the continuous data area of the full-video data in order of the block number. The reason is that both data to be reproduced can be read more quickly in parallel reproduction. Thus, first video-output time can be further reduced in parallel reproduction.

Figure 13:
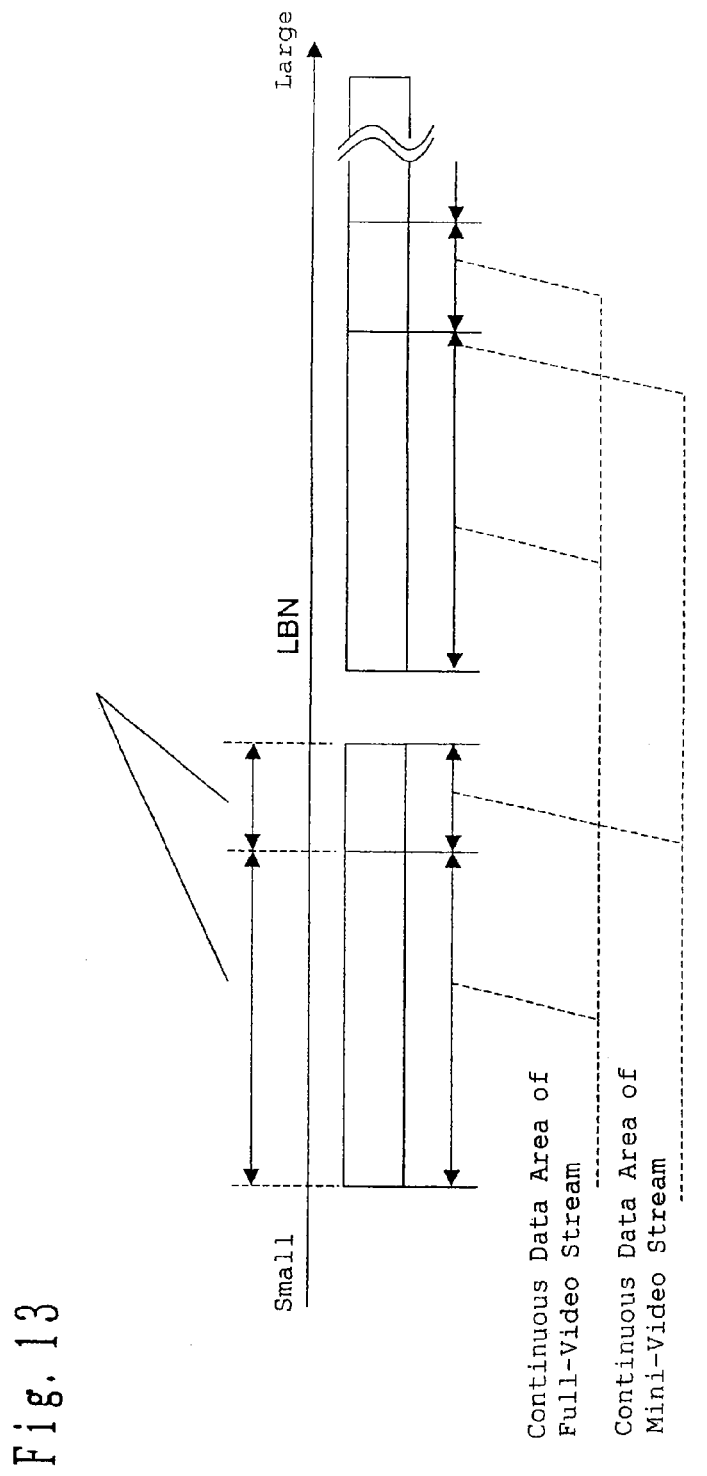
FIG. 13 is a diagram for showing continuous data of a stream of video image formed by an AV data recording and reproducing apparatus according to an embodiment of the present invention.

When the data size of each continuous data area satisfies the above equation, physically continuous location is not necessary as shown in FIG. 13. However, in order to continuously play the video and audio without freezing, it is necessary that the first continuous data area (CDA) is provided in the case of MPEG2, and that the second continuous data area is provided in the case of MPEG4, and that respective files in these continuous data areas are performed physically continuous recording. Accordingly, seeking operation of the pickup 130 for recording two files in parallel can be reduced.

Besides, in the case that the each data area is recorded so that the each data reproduction time is the same as each other, it is possible to reproduce the full-video and the mini-video in parallel. That is, for example, if the reproducing section 121 of FIG. 1 and FIG. 2 picks up both of the full-video file and the mini-video file from the DVD-RAM 131, and the MPEG2 decoding section 111 and the MPEG4 decoding section 113 decode the files respectively, and the decoded respective video signal and audio signal are provided to display of the portable video player 2 and the display apparatus 3 connected to the AV data recording and reproducing apparatus 1, it is possible to reproduce both of the full-video file and the mini-video file in parallel (in other words, in the same reproduction advance).

In this case, since each frame of the full-video file and the mini-video file is generated based on the same clock as reference, adjusting reproduction timing of first one frame can adjust reproduction timing of each of subsequent frames. The reproduction timing of each first one frame of the full-video and the mini-video can be adjusted by starting the video data corresponding to the same time based on the time information in the time-information file and the time information in the mini-video file, respectively.

Figure 14:
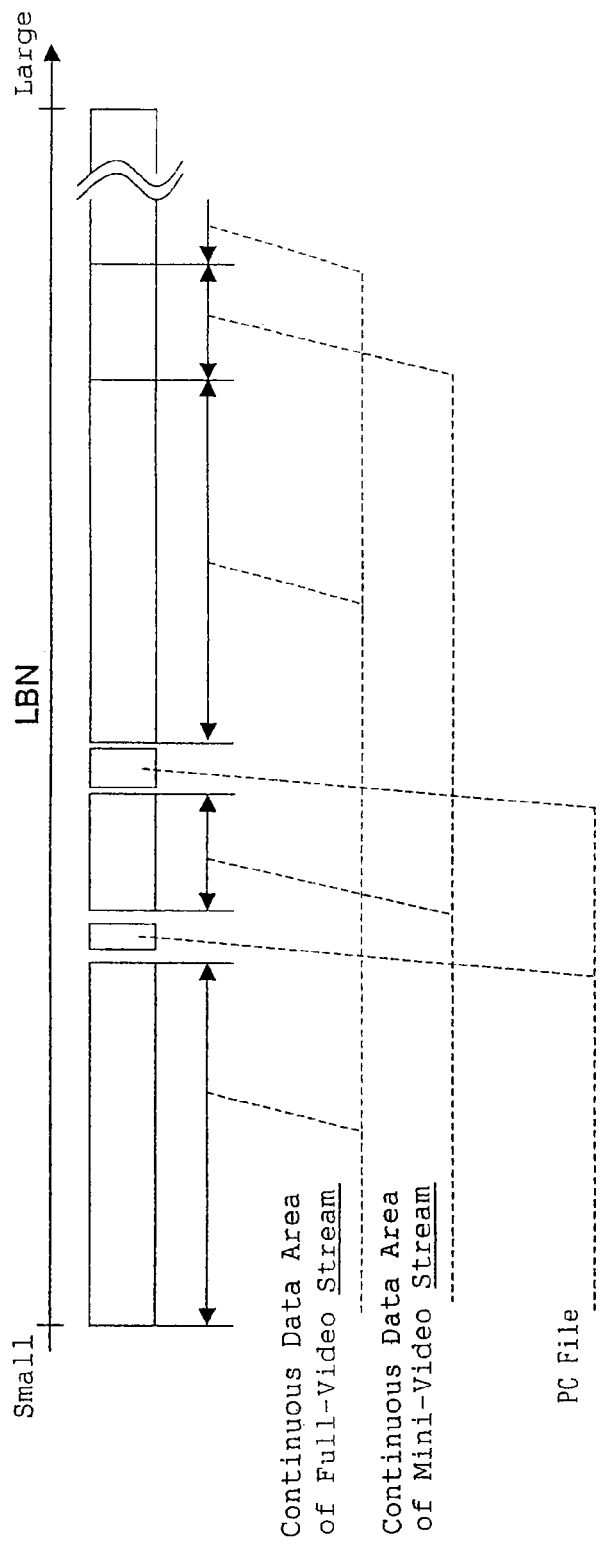
FIG. 14 is a diagram for showing continuous data of a stream of video image formed by an AV data recording and reproducing apparatus according to an embodiment of the present invention.

In addition, as shown in FIG. 14, data such as a PC file may be interposed (interleaved) between the respective continuous data areas.

Figure 15:
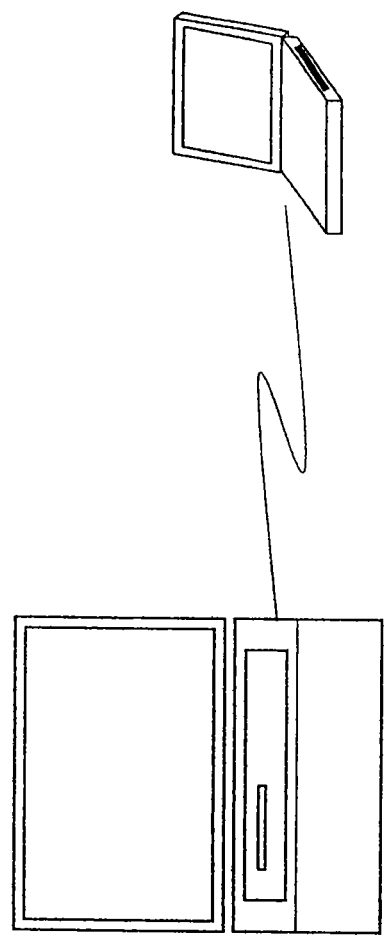
FIG. 15 is a schematic view showing a usage pattern of a recording and reproducing system according to the present invention.
Figure 16:
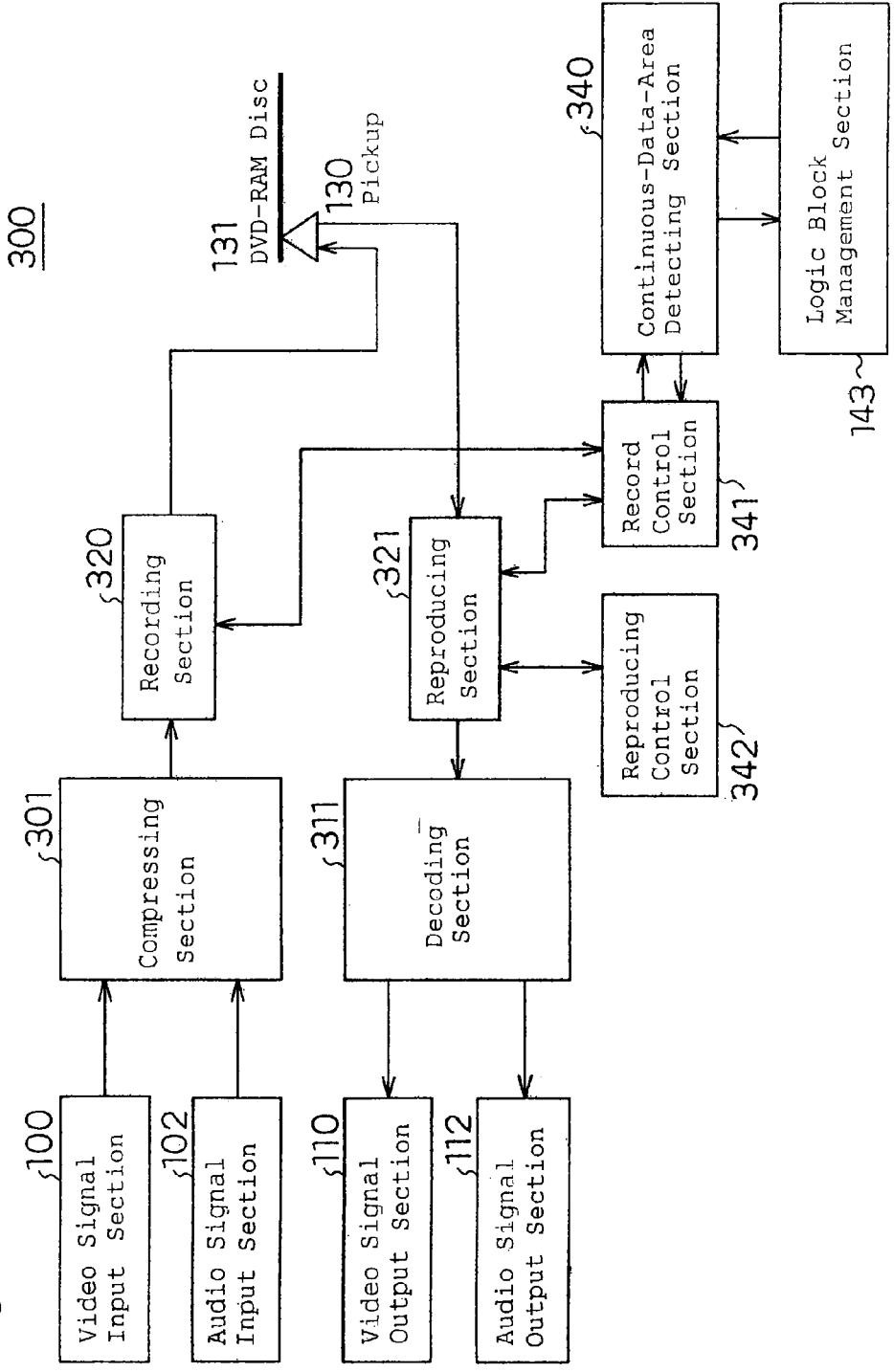
FIG. 16 is a block diagram showing a conventional AV data recording and reproducing apparatus.

In addition, although the portable video player 2 is used outdoors and the AV data recording and reproducing apparatus 1 is used indoors in the above description, needless to say, the present invention is not limited to this. Additionally, the portable video player 2 and the AV data recording and reproducing apparatus 1 may be used with connecting each other as shown in FIG. 15.

In this case, when one of the apparatuses controls the other apparatus remotely, it is not necessary to reinsert the DVD-RAM disc 131 between both the apparatuses, respectively. For example, when the reproducing section 121 of the AV data recording and reproducing apparatus 1 picks up both the full-video file and the mini-video file, and transmits the mini-video file to the portable video player 2, it is necessary for the portable video player 2 only to decode the mini-file. Therefore, it is possible to further reduce exhaustion of the battery in the portable video player 2. There is a usage mode where the user can control remotely by the portable video player 2 and plays the subsequent video in a bedroom without ejecting the DVD-RAM disc after he or she plays video by the AV data recording and reproducing apparatus in a living room, for example.

In this embodiment, a DVD-RAM disc is used as a recording medium, however the present invention is not limited to this. Any recording medium with a disc shape such as MO, an optical disc, which is DVD-R, DVD-RW, DVD+RW, CD-R, and CD-RW, for example, or a hard disc can be used. A semiconductor memory can also be used. In such cases, it is also possible to obtain similar effects.

In addition, the pickup 130 is used as a reading and writing head in this embodiment, however, a pickup and a magnetic head are used as a reading and writing head, in the case of MO, and a magnetic head is used as a reading and writing head, in the case of a hard disc.

Additionally, a broadcast program is compressed in MPEG2 and MPEG4 by the AV data recording and reproducing apparatus in this embodiment, however, in the case of digital airwaves, a MPEG2-compressed stream and a MPEG4-compressed stream included in the airwaves may be directly recorded in separated files as transport streams. On the other hand, they may be recorded in one file. Besides, in the latter case, the same filename is recorded in the co-record denoting information in FIG. 4.

In addition, the reproduction-interruption information is recorded onto a recording disc such as the DVD-RAM 131 in this embodiment, however, it may be recorded on a flash memory installed in the AV data recording and reproducing apparatus. In this case, it is necessary to record a media identifier with an identifier, in order to identify which recording medium is interrupted playing.

In addition, the co-record denoting information in FIG. 4 is recorded onto a recording disc such as the DVD-RAM 131 in this embodiment, however, it may be recorded on a flash memory installed in the AV data recording and reproducing apparatus. In this case, it is necessary to record a media identifier with an identifier, in order to identify a filename of video in the DVD-RAM disc.

Additionally, in the case of reproduction of the mini-video, in order to reduce power consumption, the number of rotation of the DVD-RAM drive may be reduced according to the bit rate of the mini-video.

In addition, the mini-video is compressed in an MP4 stream including an MPEG4 video stream in this embodiment, however, it may be compressed in a MPEG-TS stream. Additionally, a QuickTime file including a continuous JPEG stream (Motion JPEG stream) or a stream based on the Motion JPEG 2000 standard may be generated.

Further, the compression methods in the present invention are not limited to two types of compression methods, they may be three or more types of compression methods. In this case, similar effects mentioned above can be obtained by decoding by an apparatus with a decoding section suitable for each compression method.

In addition, the AV data recording and reproducing apparatus 1 is used as one example of reproducing apparatus according to the present, however, it is also used as one example of a recording apparatus according to the present, when it records signals compressed in a plurality of different compression methods and record management information of the association with each other's association of the signals onto a recording medium. In this case, since the recording apparatus according to the present is only required to have the above capability, it is not always necessary to have reproducing capability.

Additionally, it is not always necessary for the portable video player 2 to have the compressing capability in a plurality of compression methods or to have the recording capability for recording a compressed signal in the above description. Namely, the portable video player 2 may be a playback-only machine. However, it is necessary to have recording capability for recording the reproduction-interruption information onto a recording medium as mentioned above.

Furthermore, the reproducing apparatus according to the present invention may be a single apparatus with both the capability of the AV data recording and reproducing apparatus 1 and the capability of the portable video player 2. That is, it plays a role of the AV data recording and reproducing apparatus 1 with connecting to a power source line and the large display TV 3 when reproducing indoors, and plays a role of the portable video player 2 with the battery when carried outdoors. In this case, it is also possible to obtain similar effects.

In addition, each compressed data may be recorded on a flash memory installed in the AV data recording and reproducing apparatus 1.

Additionally, a broadcast program is recorded on a recording medium according to the present invention as an example in the above description, however, needless to say, the present invention is not limited to this.

Besides, a program according to the present invention is a program for causing a computer to perform a function(s) of all of or a part of means (or a device, a chip, etc.) of the reproducing apparatus or the recording apparatus according to the present invention mentioned above, and is a program cooperating with a computer.

In addition, a recording medium according to the present invention is a recording medium, which stores a program for causing a computer to perform a function(s) of all of or a part of all of or a part of means (or a device, a chip, etc.) of the reproducing apparatus or the recording apparatus according to the present invention mentioned above, and is readable by a computer, wherein said read program executes said capability by cooperating with said computer.

Besides, the above "a part of means (or a device, a chip, etc.)" is defined as one or more means of the plurality of those means in the present invention.

In addition, "capability of means (or a device, a chip, etc.)" is defined as all of or a part of capability of said means in the present invention.

Additionally, a program according to the present invention may be recorded on a recording medium readable by a computer to cooperate with said computer as one application mode.

In addition, a program according to the present invention may be read through a transmission medium to cooperate with said computer as another application mode.

Besides, a ROM or the like can be used as a recording medium, and a transmission medium such as Internet, light, a radio wave, an acoustic wave, and so on can be used as a transmission medium.

In addition, a computer according to the present invention is not limited to hardware itself such as a CPU or the like, however, it may include firmware, and an OS, further and a peripheral device.

Additionally, as mentioned above, the present invention can be constructed in hardware or in software.

Moreover, a data structure recorded on a recording medium such as a DVD-RAM mentioned above also falls within the scope of the present invention. In this case, a database, a data format, a data table, a data list, a data type, and so on are included as a data structure.

As mentioned above, a reproducing apparatus and a recording apparatus according to the present invention can effectively play a broadcast program both outdoors and indoors. That is, exhaustion of a battery of a recording and reproducing apparatus can be reduced in reproduction outdoors, and it is possible to play the subsequent same program from some midpoint on a large display with easily switched.

A recording and reproducing system according to the present invention has an effect that it can play video and/or audio suitably for a condition of each playing mode even when a previously specified playing mode is changed, therefore, it is advantageous for a reproducing apparatus and so on.

The invention claimed is:

1. A method, comprising:
reproducing a broadcast program on a first reproduction apparatus;
interrupting the reproduction of the broadcast program on the first reproduction apparatus in response to a user input;
defining interruption information which represents where the broadcast program was interrupted on the first reproduction apparatus in response to the user input;
recording the interruption information on a recording medium; and
reproducing the broadcast program on a second reproduction apparatus, from where the broadcast program was interrupted on the first reproduction apparatus, based on the interruption information recorded on the recording medium;
wherein the second reproduction apparatus is different from the first reproduction apparatus.

2. The method of claim 1, wherein the reproduced broadcast program at the second reproduction apparatus comprises at least one of (i) the entire broadcast program and (ii) the remainder of the broadcast program from where the broadcast program was interrupted on the first reproduction apparatus.

3. The method of claim 1, wherein the broadcast program includes AV data having different bit rates.

4. The method of claim 3, wherein the different bit rates include at least one of MPEG2, MPEG4, QuickTime file, Flash, JPEG, and stream based on JPEG.

5. The method of claim 4, wherein the broadcast program includes AV data having different bit rates for reproduction at the first reproduction apparatus and second reproduction apparatus.

6. The method of claim 1, wherein at least one of the broadcast program and the interruption information is stored in a recording medium affiliated with at least one of the first reproduction apparatus and second reproduction apparatus.

7. The method of claim 6, wherein the recording medium is at least one of a hard drive, a flash memory, and a ROM affiliated with at least one of the first reproduction apparatus and the second reproduction apparatus.

8. The method of claim 1, wherein at least one of the broadcast program and the interruption information is communicated using a transmission medium that includes at least one of the internet, light waves, radio waves, and acoustic waves.

9. The method of claim 1, wherein at least one of the first reproduction apparatus and the second reproduction apparatus includes at least one of a computer, a portable device, and a computer affiliated with a display.

10. A method, comprising:
communicating, using a transmission medium, a broadcast program to a first reproduction apparatus;
receiving interruption information which represents where the broadcast program was interrupted on the first reproduction apparatus, the interruption of the broadcast program on the first reproduction apparatus occurring in response to a user input;
recording the interruption information on a recording medium; and
communicating, using the transmission medium, the broadcast program on a second reproduction apparatus, from where the broadcast program was interrupted on the first reproduction apparatus, based on the interruption information recorded on the recording medium;
wherein the second reproduction apparatus is different from the first reproduction apparatus.

11. The method of claim 10, wherein the broadcast program communicated to the second reproduction apparatus is comprising at least one of (i) the entire broadcast program and (ii) the remainder of the broadcast program from where the broadcast program was interrupted on the first reproduction apparatus.

12. The method of claim 10, wherein the broadcast program and interruption information are stored in a recording medium and communicated using the transmission medium.

13. The method of claim 12, wherein the recording medium is at least one of a hard drive, a flash memory, and a ROM affiliated with at least one of the first reproduction apparatus and the second reproduction apparatus.

14. The method of claim 10, wherein the transmission medium includes at least one of the Internet, light waves, radio waves, and acoustic waves.

15. The method of claim 10, wherein the broadcast program includes AV data having different bit rates.

16. The method of claim 15, wherein the different bit rates include at least one of MPEG2, MPEG4, QuickTime file, Flash, JPEG, and stream based on JPEG.

17. The method of claim 15, wherein the broadcast program communicated to the first reproduction apparatus and the second reproduction apparatus have different bit rates.

18. The method of claim 10, wherein at least one of the first reproduction apparatus and the second reproduction apparatus includes at least one of a computer, a portable device, and a computer affiliated with a display.

19. A reproducing apparatus, comprising:
a reproducing unit that reproduces video data; and
a defining unit that defines interruption information which represents where the reproducing unit interrupts a reproduction of the video data, the interruption of the video data by the reproducing unit occurring in response to a user input;
wherein the interruption information is recorded on a recording medium;
wherein a second reproducing apparatus reproduces the video data, from where the reproducing unit interrupts a reproduction of the video data, based on the interruption information recorded on the recording medium; and
wherein the second reproducing apparatus is different from the reproducing apparatus.

20. A reproducing apparatus, comprising:
a receiving unit that receives interruption information which is recorded on a recording medium and which represents where a reproduction of video data was interrupted during reproduction on a second reproduction apparatus, the interruption of the video data during reproduction on the second apparatus occurring in response to a user input; and
a reproducing unit that reproduces the video data, from where the reproduction of the video data was interrupted during reproduction on the second reproduction apparatus, based on the interruption information received by the receiving unit;
wherein the second reproducing apparatus is different from the reproducing apparatus.

21. A system for resuming reproduction, on a second reproducing apparatus, video data which was interrupted during reproduction on a first reproducing apparatus, the first reproducing apparatus being different from the second reproducing apparatus, the system comprising:
a recording unit operable to store interruption information on a recording medium, the interruption information representing where the first reproducing apparatus interrupts a reproduction of the video data, the interruption of the video data by the first reproducing apparatus occurring in response to a user input; and a reproducing unit operable to read the interruption information from the recording medium;

wherein the second reproducing apparatus is operable to resume reproduction of the video data, from where the first reproducing apparatus interrupted a reproduction of the video data, based on the interruption information.

* * * * *

UNITED STATES PATENT AND TRADEMARK OFFICE
CERTIFICATE OF CORRECTION

PATENT NO. : 8,660,404 B2  
APPLICATION NO. : 13/307434  
DATED : February 25, 2014  
INVENTOR(S) : Masanori Itoh Page 1 of 1

It is certified that error appears in the above-identified patent and that said Letters Patent is hereby corrected as shown below:

ON THE TITLE PAGE:

At Item (60), Related U.S. Application Data, "No. 10/819,851" should read -- 10/519,851 --.

Signed and Sealed this
Twenty-seventh Day of May, 2014

Michelle K. Lee
*Deputy Director of the United States Patent and Trademark Office*